July 12, 1966

M. PRESTON 3,260,070

UNIVERSAL JOINT

Filed Sept. 24, 1964

INVENTOR
Martin Preston

July 12, 1966  M. PRESTON  3,260,070
UNIVERSAL JOINT

Filed Sept. 24, 1964  2 Sheets-Sheet 2

INVENTOR
Martin Preston

United States Patent Office 3,260,070
Patented July 12, 1966

3,260,070
UNIVERSAL JOINT
Martin Preston, 300 N. State St., Apt. 5701,
Chicago, Ill. 60610
Filed Sept. 24, 1964, Ser. No. 399,644
1 Claim. (Cl. 64—21)

This invention relates to universal joints and particularly to a universal joint of the constant velocity type, one that permits a relatively high angular displacement between the shafts which it connects and is capable of transmitting a relatively high torque between these shafts. A further advantage of this constant speed universal joint is that the shafts connected therewith pivot about a fixed point and while doing so are not displaced axially.

Other advantages will appear from the following description of a simple embodiment of the invention containing a minimum number of parts necessary for its proper functioning.

Figure 1:
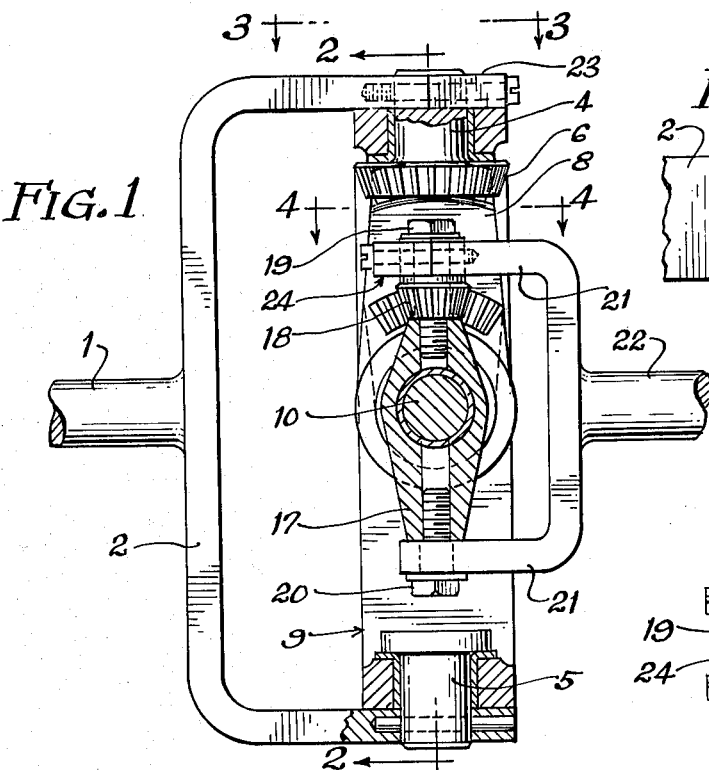
FIGURE 1, is a longitudinal partial sectional view of the joint taken along line 1—1 on FIG. 2.
Figure 3:
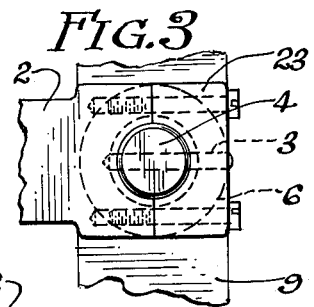
Figure 4:
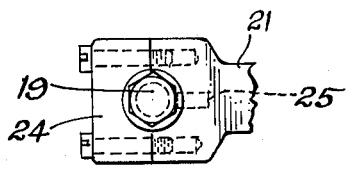

FIGURES 3 and 4 are partial plan views taken on lines 3—3 and 4—4, respectively, on FIGURE 1.

Figure 2:
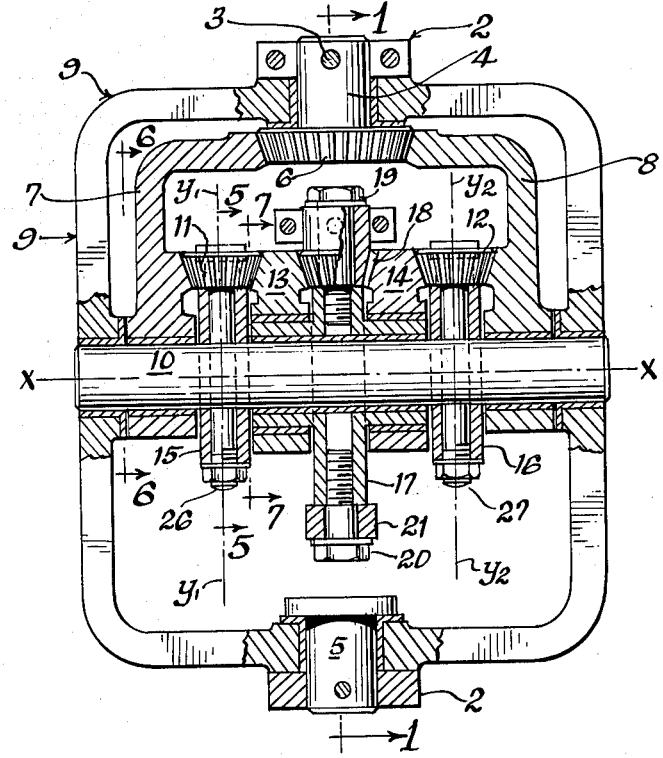
FIGURE 2, represents a transverse sectional view taken on line 2—2 on FIG. 1.
Figure 5:
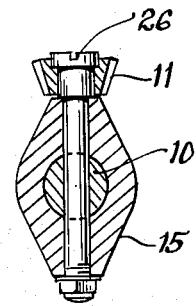
Figure 6:
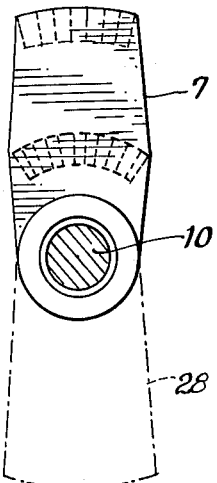
Figure 7:
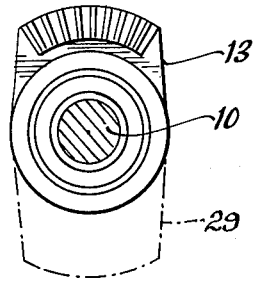

FIGURES 5, 6 and 7 are sectional views taken on lines 5—5, 6—6, 7—7, respectively, on FIGURE 2.

Figure 8:
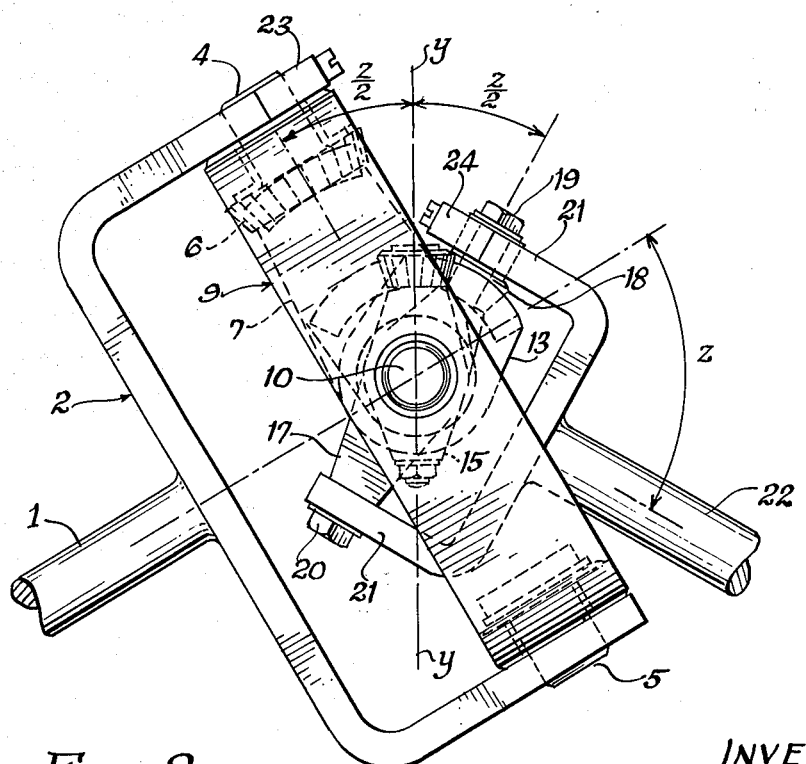

FIGURE 8, is a longitudinal side view similar to FIGURE 1 but taken from the outside of the joint with the shaft center lines displaced 60 degrees with respect to each other.

As it appears from the above figures, and particularly from FIGURE 1, the ends of shafts 1 and 22, which the joint connects, are pronged or yoke shaped. Shaft 1 terminates in yoke 2, and shaft 22 terminates in yoke 21. Yoke 2 is provided with cap 23 (FIGURE 3) which clamps stub-shaft extension 4 of bevel gear 6 which is furthermore secured by pin 3 against rotation with respect to said yoke (FIGURES 2 and 3). Stub-shaft 4 is rotatably mounted in a bushing in rectangular frame 9 (FIGURES 1 and 2) that in turn carries bushed transverse shaft (10) on which are rotatably mounted bevel gear segments 13 and 14 (See FIGURE 7) and hollow cruciform member 17 (See FIGURES 1 and 2). Said cruciform member 17 is provided with an enlarged central portion into which stud bolt 19 serving as a journal for bevel gear 18 is screwed (FIGURES 1 and 2). Bevel gear 18 has a hollow cylindrical extension which is clamped by cap 24 to yoke 21 and is secured against rotation with respect to said yoke by pin 25 (FIGURE 4).

Transverse shaft 10 furthermore carries pins 26 and 27 passing through holes provided in said shaft. Pins 26 and 27 are surrounded by spacers 15 and 16 (See FIGURES 2 and 5) and carry on the upper part of their shanks idler gears 11 and 12.

In this manner two gear trains connect yokes 2 and 21 forming the ends of shafts 1 and 22. As it is seen in FIGURE 2, bevel gear 18 connected to yoke 21 engages on the left double gear segment 13 which in turn meshes with idler gear 11 which in turn meshes with bevel gear segment 7 the upper end of which meshes with bevel gear 6 keyed to yoke 2.

Symmetrically to the gearing on the left of bevel gear 18 there is provided on the right side of bevel gear 18 a gear train comprising double gear segment 14, idler gear 12 and bevel gear segment 8 the upper portion of which also meshes with bevel gear 6.

It follows from the kinematics of this double gear train, that if gears 6 and 18 have the same pitch angle, the plane containing axis $y_1$—$y_1$ of pin 26, axis $y_2$—$y_2$ of pin 27 and axis $x$—$x$ of transverse shaft 10 (FIGURES 2 and 8) will always bisect the angle included between the center lines of shafts 1 and 22. This means that if one of the shafts is tilted in any direction with respect to the above defined plane, the other shaft will take on a symmetrical orientation with respect to this plane. It also follows from this that if shafts 1 and 22 are tilted in any angular position with respect to each other, and if then one of these shafts is rotated, the angular velocity of axis $x$—$x$ of transverse shaft 10 moving in aforesaid plane will have identical ratios to the angular velocities of shafts 1 and 22. Therefore, the instantaneous angular velocity of shafts 1 and 22 will be always the same.

The fact that aforementioned plane containing axes $x$—$x$, $y_1$—$y_1$ and $y_2$—$y_2$ always bisects the angle included by the centerlines of drive shafts 1 and 22 can be demonstrated as follows:

An angular tilt of shaft 1 about axis $x$—$x$ during which bevel gear 6 does not rotate with respect to gimbal frame 9, will produce an equal tilt of gear segments 7 and 8 which are both in engagement with bevel gear 6. Under these circumstances shaft 1, gimbal frame 9 and gear segments 7 and 8 will move together as a solid body. If during this movement drive shaft 22 and the therewith associated bevel gear 18 which meshes with bevel gear segments 13 and 14 remain stationary, so that these elements also act as a solid body, idler gears 11 and 12 will be forced to rotate in opposite directions and their axes $y_1$—$y_1$ and $y_2$—$y_2$ will be tilted by an angle which is one half of the tilt angle of the parts associated with drive shaft 1. From this follows that if shaft 1 is tilted with respect to shaft 22 about axis $x$—$x$, the plane containing $y_1$—$y_1$ and $y_2$—$y_2$ will always bisect the angle included by shafts 1 and 22. In FIGURE 8 the angle included between shafts 1 and 22 to 120 degrees, shaft 22 being displaced from its in-line position by 60 degrees which angle is denoted by the letter Z. With a slight modification of the shape of the component parts of the shown embodiment the maximum value of this angle could be made as high as about 75 degrees.

On the other hand, if we assume that shaft 1 is tilted with respect to gimbal frame 9 thereby causing bevel gear 6 to rotate with respect to said gimbal frame, we find that gear segments 7 and 8 will be forced to rotate in opposite directions and these rotations will be reversed by idler gears 11 and 12 so that gear segments 13 and 14 will also rotate in opposite direction with respect to each other, however, gear segment 13 will rotate in the same direction as gear segment 8 and gear segment 14 will move together with gear segment 7. The opposite rotations of gear segments 13 and 14 will in turn cause bevel gear 18 and the therewith associated drive shaft 22 to tilt through the same angle with reference to the plane containing axes $y_1$—$y_1$ and $y_2$—$y_2$ as drive shaft 1, Q.E.D.

It also follows from the above that idler gear 11 coacting with bevel gear segments 7 and 13 constitutes a set of reversing gears whose functions could be equally well performed by a set of spur gears mounted in an epicyclic gear train. This naturally applies also to idler gear 12 coacting with gear segments 8 and 14.

All bevel gears in the joint can be either of the straight or of the spiral type and all bushings shown could be substituted for by anti-friction bearings preferably of the needle bearing type.

In applying the principle of linking the yokes of the two shafts by a double gear train, the embodiment shown in FIGURES 1 and 2 has the advantage of employing the fewest number of gears but has the disadvantage of a lopsided stress distribution in the yokes on the shaft ends, since only one prong of each yoke carries the main bevel pinions 6 and 18 while the other prong is freely pivoting on pins 5 and 20, respectively. For a more symmetrical stress distribution and for a better dynamic balance, it may be desirable to mount the duplicates of bevel pinions 6 and 18 on both prongs of the yokes and to provide a double gear train also in the lower half of the rectangular gimbal frame 9 (FIGURE 2) in symmetry to the gear arrangement in the upper half. However, better dynamic balancing could also be obtained by the addition of counterweights 28 and 29 to gear segments 7, 8, 13 and 14, respectively, as indicated in phantom lines in FIGURES 6 and 7.

What I claim is:

A constant velocity universal joint comprising a first shaft and a second shaft, each of said shafts terminating in a two pronged yoke, the spacing of the prongs of the first shaft being wider than that of the second shaft and the tips of the prongs of the first shaft being pivotally connected to the primary opposite sides of a frame, one of the prongs pivoting on said frame being rigidly connected to a first bevel gear and the tip of the prongs of said second shaft being pivotally connected to the primary opposite arms of a cruciform member, one of the prongs pivoting on said cruciform member being rigidly connected to a second bevel gear; a transverse shaft pivotally mounted through the secondary opposite sides of said frame, the pivot axis through said secondary sides of said frame intersecting at right angles the axis of pivots by which said first shaft is connected to said primary sides of said frame, and said cruciform member being pivotally mounted on said transverse shaft by its secondary arms the pivot axis through which intersects at right angles the pivot axis passing through said primary arms of said cruciform member, the latter pivot axis being the one about which the prongs of said second shaft pivots; two primary bevel gear segments mounted pivotally on said transverse shaft and meshing with said first bevel gear on its opposite sides; two secondary bevel gear segments mounted pivotally on said transverse shaft and meshing with said second bevel gear on its opposite sides; two sets of reversing gears, the first set drivingly connecting one of said two primary bevel gear segments with one of said two secondary bevel gear segments and the second set drivingly connecting the other of said two primary bevel gear segments with the other of said two secondary bevel gear segments.

References Cited by the Examiner

UNITED STATES PATENTS

| 1,899,170 | 2/1933 | Wainwright | 64—21 |
| 3,036,446 | 5/1962 | Morgenstern | 64—18 |

FOREIGN PATENTS

| 352,079 | 4/1922 | Germany. |

MILTON KAUFMAN, *Primary Examiner.*

H. C. COE, *Examiner.*